United States Patent
Ophardt et al.

(10) Patent No.: US 8,342,368 B2
(45) Date of Patent: Jan. 1, 2013

(54) CONVERTIBLE PERISTALTIC AND PISTON PUMP DISPENSER

(75) Inventors: Heiner Ophardt, Vineland (CA); Andrew Jones, Smithville (CA)

(73) Assignee: Gotohti.com Inc., Beamsville, Ontario (CA)

( * ) Notice: Subject to any disclaimer, the term of this patent is extended or adjusted under 35 U.S.C. 154(b) by 245 days.

(21) Appl. No.: 12/923,457

(22) Filed: Sep. 22, 2010

(65) Prior Publication Data

US 2011/0079615 A1      Apr. 7, 2011

(30) Foreign Application Priority Data

Oct. 2, 2009    (CA) .................................... 2680993

(51) Int. Cl.
*B67D 7/06* (2010.01)
*B67D 7/70* (2010.01)
*B65D 37/00* (2006.01)

(52) U.S. Cl. ............... 222/181.3; 222/135; 222/137; 222/207; 222/214

(58) Field of Classification Search ............ 222/181.3, 222/135, 137, 207, 214
See application file for complete search history.

(56) References Cited

U.S. PATENT DOCUMENTS

| | | | |
|---|---|---|---|
| 5,676,277 A * | 10/1997 | Ophardt ........................ | 222/83 |
| 5,810,204 A * | 9/1998 | Devlin et al. ................. | 222/82 |
| 5,944,227 A * | 8/1999 | Schroeder et al. ......... | 222/144.5 |
| 6,189,740 B1 * | 2/2001 | Wade et al. ................... | 222/207 |
| 6,601,736 B2 * | 8/2003 | Ophardt et al. ............ | 222/181.1 |
| 6,929,155 B1 * | 8/2005 | Sayers ........................ | 222/181.3 |
| 7,303,099 B2 * | 12/2007 | Ophardt .................... | 222/321.8 |
| 7,556,178 B2 | 7/2009 | Ophardt | |
| 7,568,598 B2 * | 8/2009 | Ophardt et al. ............... | 222/518 |
| 7,735,686 B2 * | 6/2010 | Ophardt ....................... | 222/136 |
| 7,984,829 B2 * | 7/2011 | Cittadino et al. ........ | 222/153.03 |
| 8,113,388 B2 * | 2/2012 | Ophardt et al. ............ | 222/181.3 |
| 2005/0139612 A1 * | 6/2005 | Matthews et al. ............ | 222/190 |
| 2011/0297701 A1 * | 12/2011 | Ophardt et al. ............ | 222/181.3 |

FOREIGN PATENT DOCUMENTS

| | | | |
|---|---|---|---|
| EP | 2067426 A2 * | 6/2009 | |
| GB | 2418416 A * | 3/2006 | |
| GB | 2425767 A * | 11/2006 | |
| WO | WO 01/52709 A1 * | 7/2001 | |

* cited by examiner

*Primary Examiner* — Kevin T Truong
*Assistant Examiner* — Michael Melaragno
(74) *Attorney, Agent, or Firm* — Thorpe North & Western LLP

(57) ABSTRACT

A dispenser for flowable material adapted for engagement and for dispensing fluid from either a replaceable piston pump reservoir unit comprising a reservoir bottle and a piston pump or a replaceable peristaltic pump reservoir unit comprising a reservoir bottle and a deformable tube member.

20 Claims, 18 Drawing Sheets

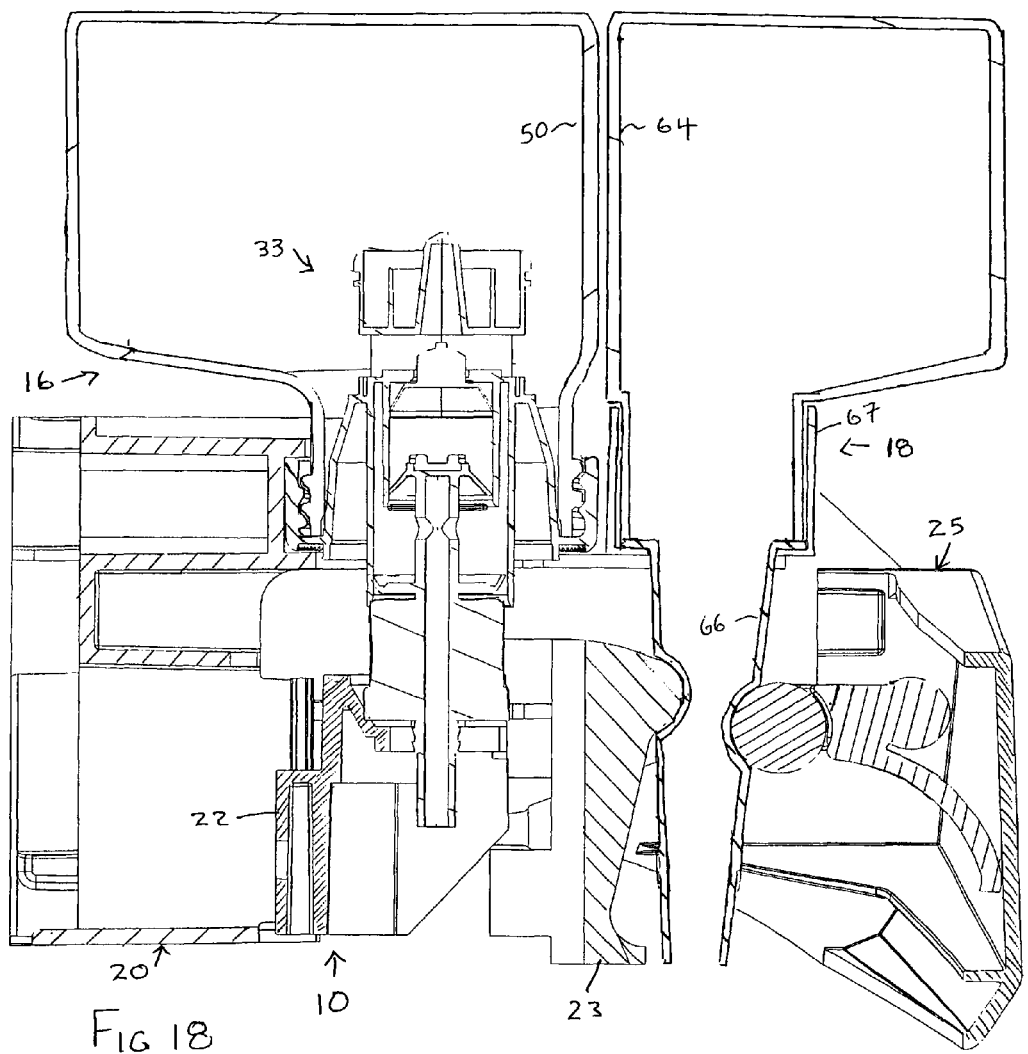

CONVERTIBLE PERISTALTIC AND PISTON PUMP DISPENSER

SCOPE OF THE INVENTION

The present invention provides a fluid dispenser adapted for dispensing fluid from a replaceable reservoir unit including either a piston pump or a peristaltic pump.

BACKGROUND OF THE INVENTION

In the soap dispensing industry, there are many types of products to be dispensed including pastes, lotions, gels, liquids and foam products. These various products can require different pumping arrangements including different pumps and operational strokes. For example, some products are advantageously dispensed via soap dispensers including a reciprocating piston pump. While other products are preferably dispensed via a peristaltic pump in which a tube is squeezed to displace the fluid.

The present invention has appreciated that a disadvantage arises that known dispensing units are not capable of dispensing fluid from both a piston pump and a peristaltic pump.

SUMMARY OF THE INVENTION

To at least partially overcome these disadvantages of previously known devices, the present invention provides a dispenser for flowable materials comprising a housing adapted to dispense materials either via a piston pump or a peristaltic pump.

In accordance with the present invention, there is provided a dispenser for flowable material adapted for engagement and for dispensing fluid from either a replaceable piston pump reservoir unit comprising a reservoir bottle and a piston pump or a replaceable peristaltic pump reservoir unit comprising a reservoir bottle and a deformable tube member. The dispenser housing includes having a first socket arrangement adapted to removably engage the piston pump reservoir unit and a peristaltic pump socket arrangement adapted to removably engage the peristaltic pump reservoir unit. The housing includes an actuator member which when moved, moves both a piston carriage member adapted to be coupled to a piston element of the piston pump reservoir unit and a block member adapted to compress the deformable tube of the peristaltic pump reservoir unit. By movement of the actuator member, material is dispensed from the piston pump reservoir unit and/or the peristaltic pump reservoir unit coupled to the housing.

In one aspect, the present invention provides a dispenser for flowable materials comprising:

a replaceable piston pump reservoir unit comprising a reservoir for flowable material and a piston pump, the piston pump including a piston chamber-forming member coupled to the reservoir and forming a piston chamber in communication with material in the reservoir, the piston pump including a piston element reciprocally slidably received in piston chamber-forming member for movement between a retracted position and an extended position to dispense material from the reservoir out a piston pump outlet on the piston element, a replaceable peristaltic pump reservoir unit comprising a reservoir for flowable material and a deformable tube member in communication with material in the reservoir providing a peristaltic pump outlet to dispense material from the reservoir, a housing;

the housing including both a piston pump socket arrangement adapted to removably engage the piston pump reservoir unit for dispensing material from the piston pump reservoir unit and a peristaltic pump socket arrangement adapted to removably engage the pump reservoir unit for dispensing material from the peristaltic pump reservoir unit;

the piston pump socket arrangement including a piston carriage member mounted to the housing for relative movement between a first position and a second position;

the piston carriage adapted to removably engage the piston element;

an actuator member mounted to the housing for relative movement between a retracted position and an extended position, a biasing member biasing the actuator member toward one of the retracted position and the extended position;

the actuator member having a handle portion for engagement by a user to manually move the actuator member toward the one of the retracted position and the extended position against the bias of the biasing member;

the piston carriage member and actuator member coupled such that movement of the actuator member between the retracted position and the extended position correspondingly moves the piston carriage member between the first position and the second position;

the peristaltic pump socket arrangement having a first block member and a second block member removably receiving the deformable tube there between, the first block member and the second block mounted to the housing for movement towards and away from each other between a distant first position and a proximate second position to compress the deformable tube and dispense material from an outlet distal end of the deformable tube;

the first block member and actuator member coupled such that movement of the actuator member between the retracted position and the extended position correspondingly moves the first member between the first position and the second position.

BRIEF DESCRIPTION OF THE DRAWINGS

Further aspects and advantages of the present invention will become apparent from the following description taken together with the accompanying drawings in which:

FIG. 18 is a side view of the dispenser base assembly of FIG. 1 with both a piston pump reservoir unit and a peristaltic pump reservoir unit attached.

DETAILED DESCRIPTION OF THE DRAWINGS

Figure 1:
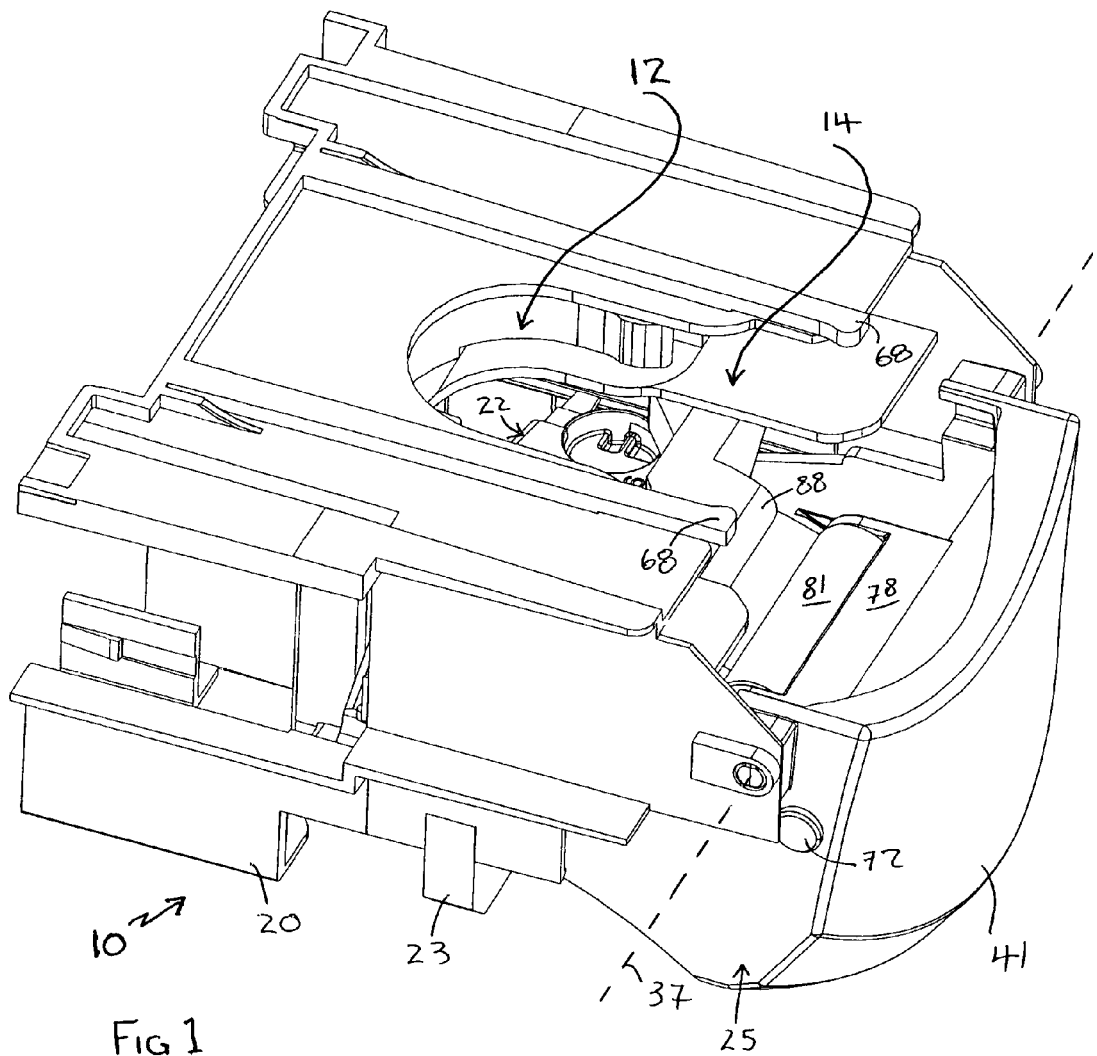
FIG. 1 is a perspective view of upper portions of a dispenser base assembly in accordance with a first embodiment of the present invention.
Figure 7:
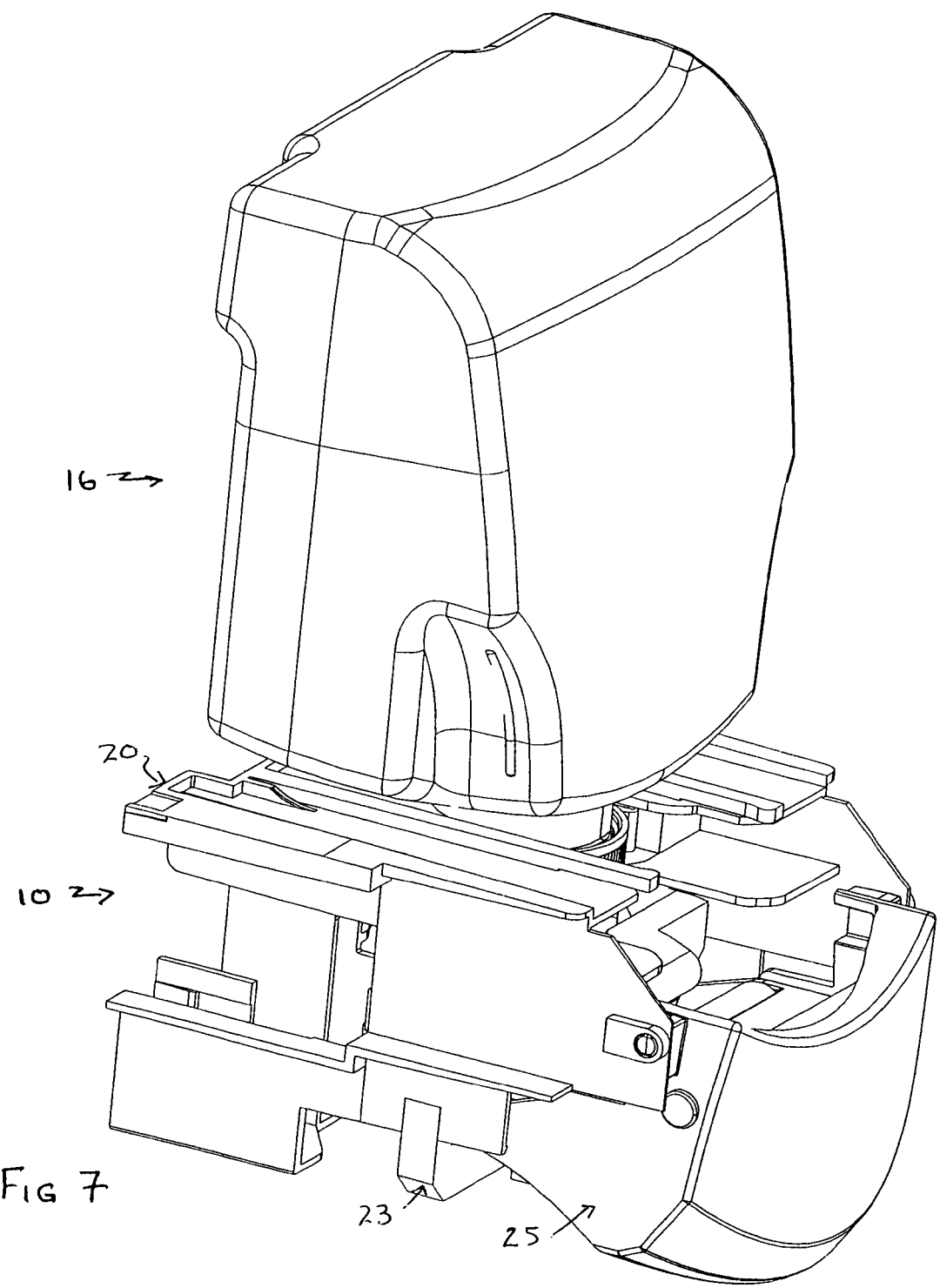
FIG. 7 is a pictorial view showing the dispenser assembly of FIG. 1 with a piston pump reservoir unit coupled thereto.
Figure 8:
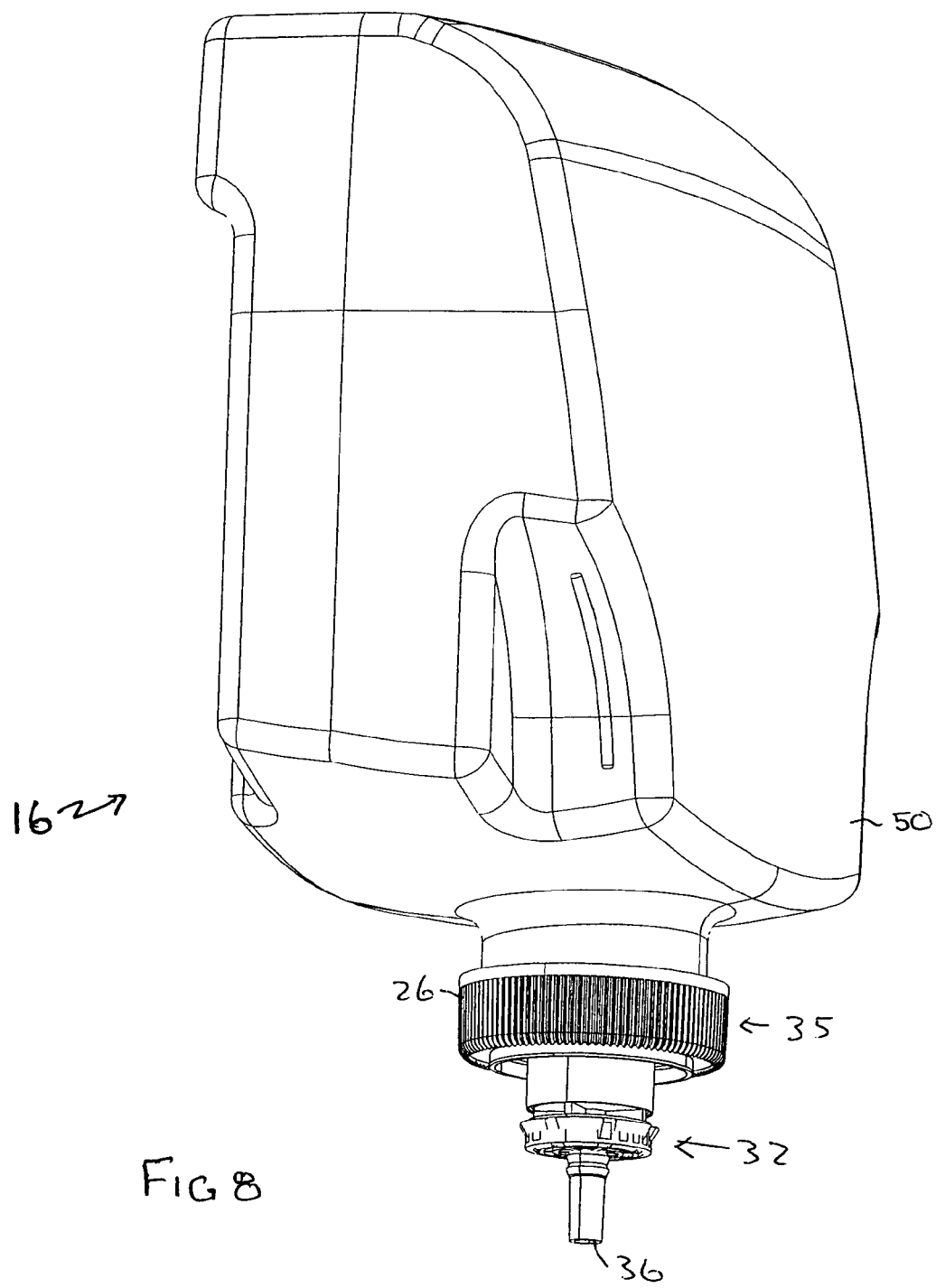
FIG. 8 is a perspective view of the piston pump reservoir unit shown in FIG. 7.
Figure 11:
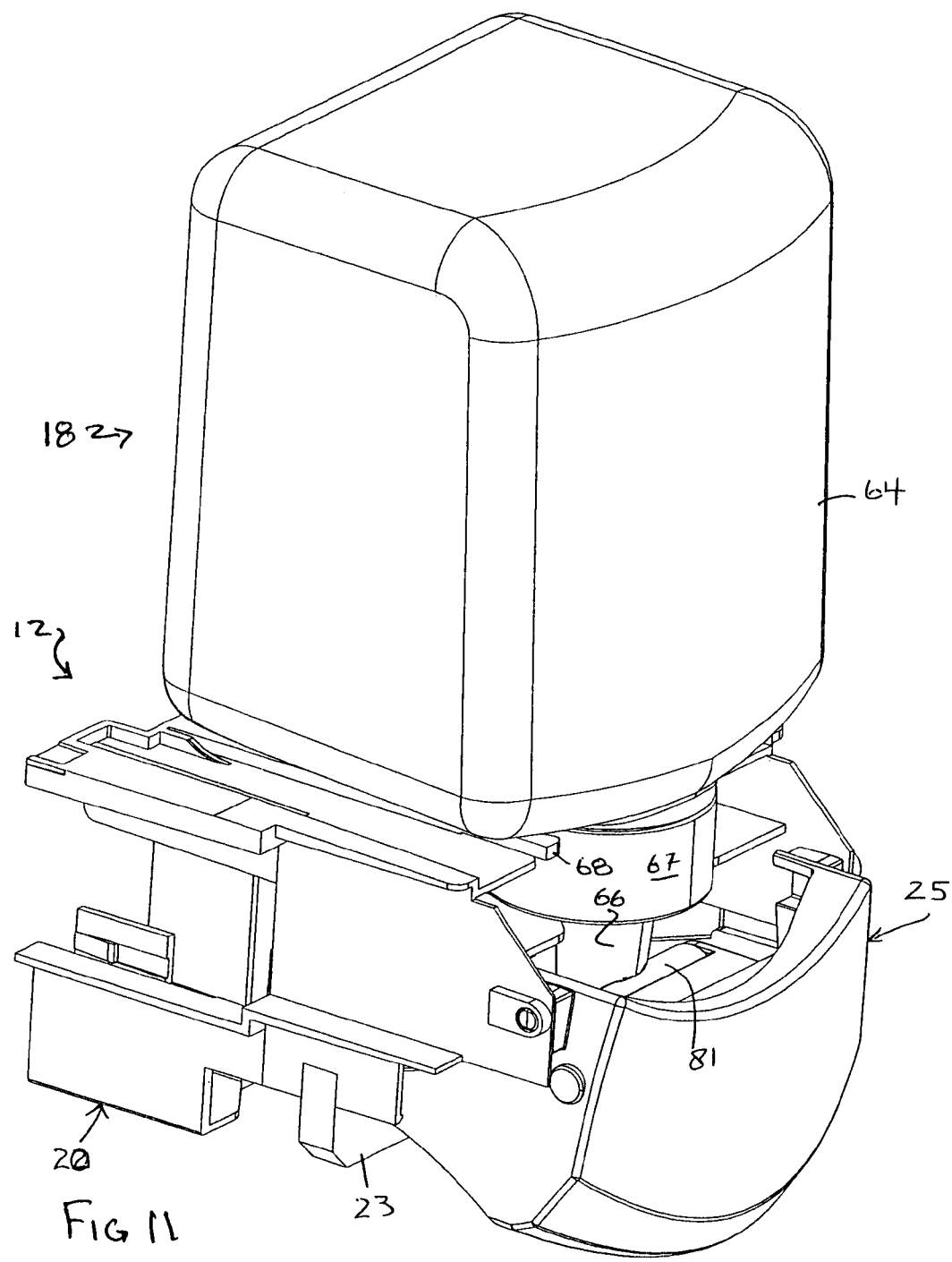
FIG. 11 is a pictorial view showing the dispenser assembly of FIG. 1 with a peristaltic pump reservoir unit coupled thereto.

Reference is made to FIG. 1 which shows a dispenser base assembly 10 in accordance with the present invention. The base assembly 10 provides a piston pump socket 12 and a peristaltic pump socket 14. The piston pump socket 12 is adapted to removably engage a piston pump reservoir unit 16 as shown in FIG. 8 in a coupled manner as shown in FIG. 7. The peristaltic pump socket 14 is adapted to receive a peristaltic pump reservoir unit 18 shown in FIG. 12 in a coupled manner as shown in FIG. 11.

Figure 2:
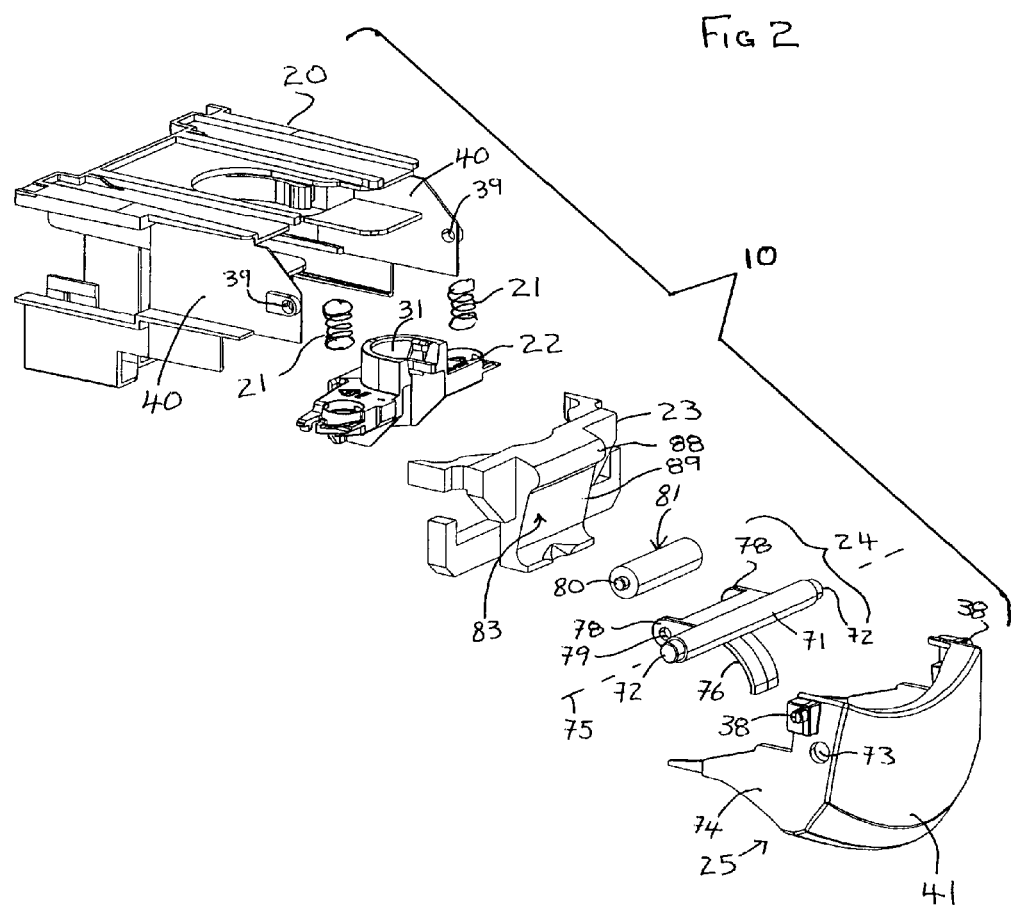
FIG. 2 is an exploded view showing the components of the dispenser base assembly shown in FIG. 1.

As seen in FIG. 2, the dispenser base assembly 10 includes a housing 20, biasing springs 21, a piston carriage member 22, a first block member 23, a second block assembly 24 and a push lever actuator member 25.

Figure 3:
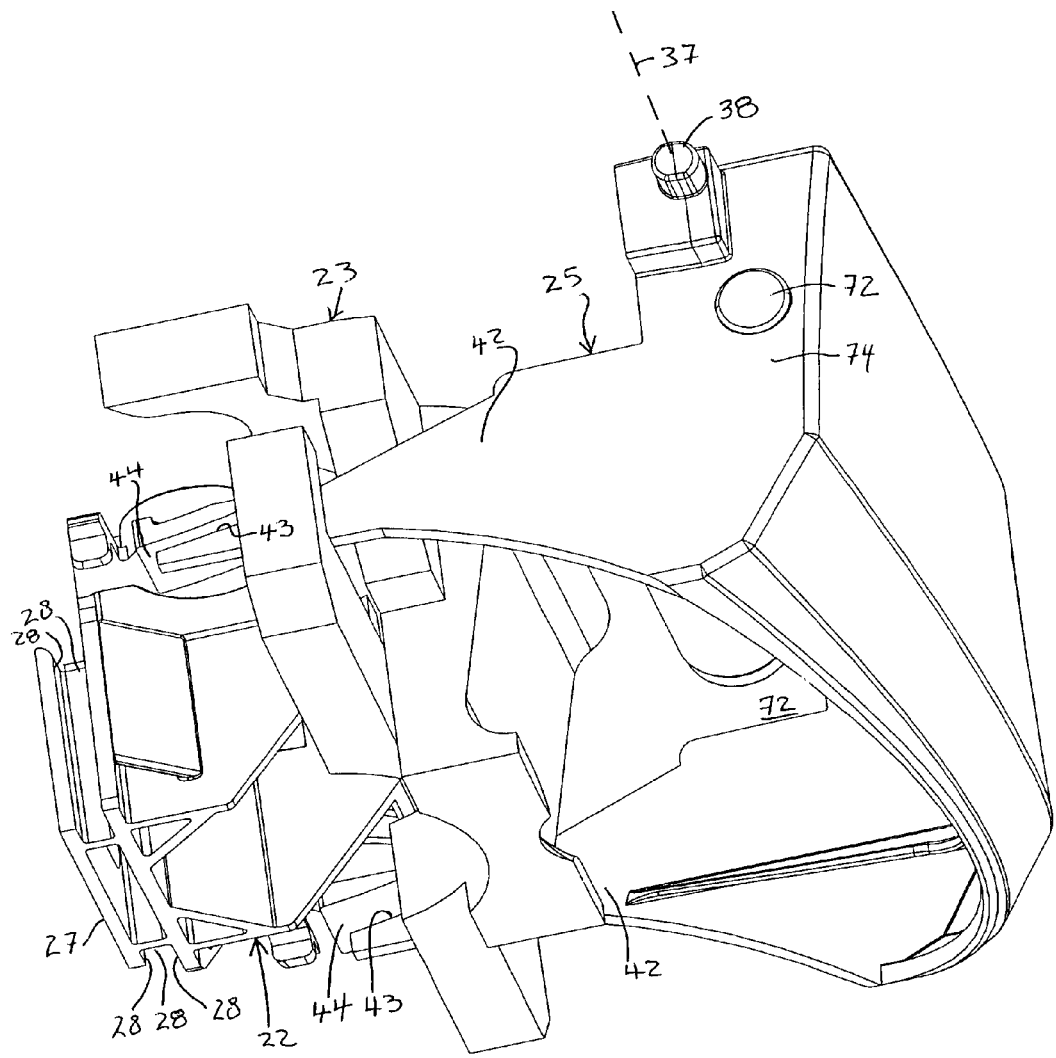
FIG. 3 is a perspective view of lower portions of selected elements of the dispenser base assembly shown in FIG. 2.
Figure 4:
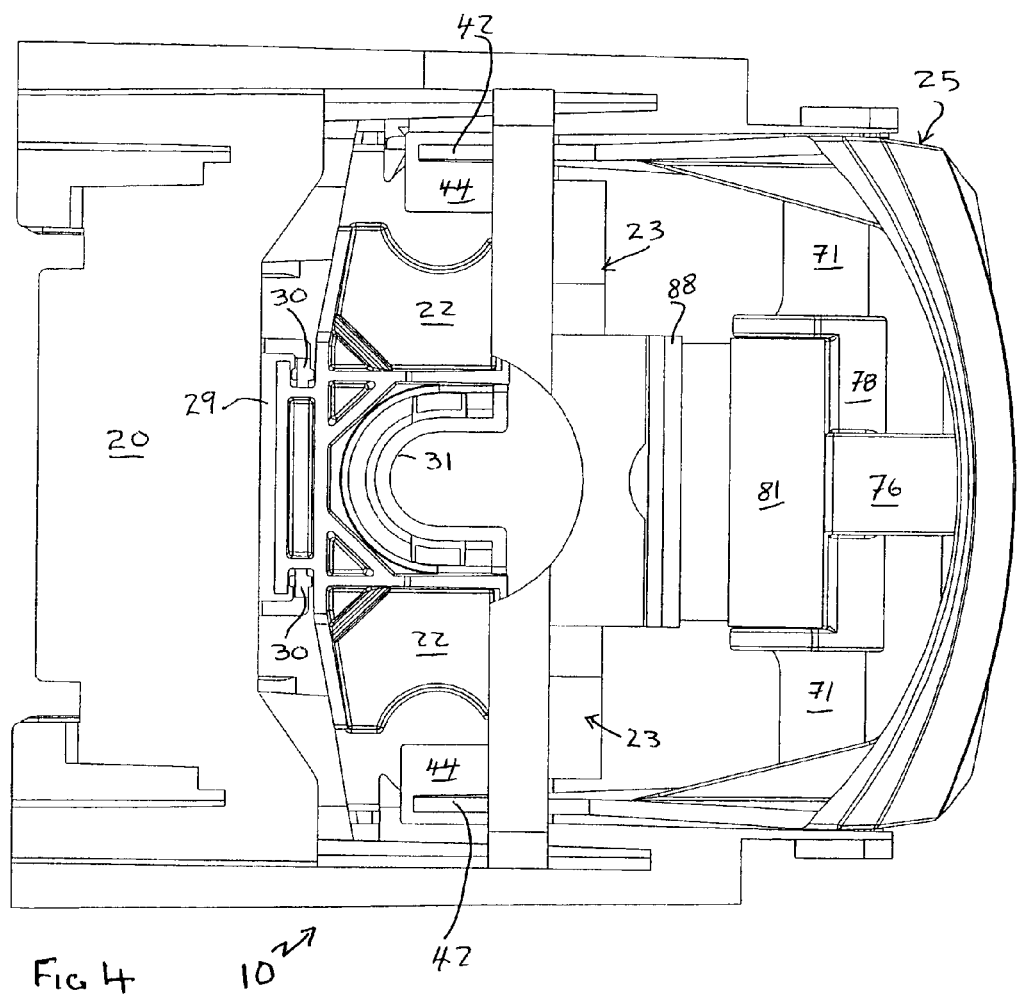
FIG. 4 is a bottom view of the dispenser base assembly shown in FIG. 1.
Figure 9:
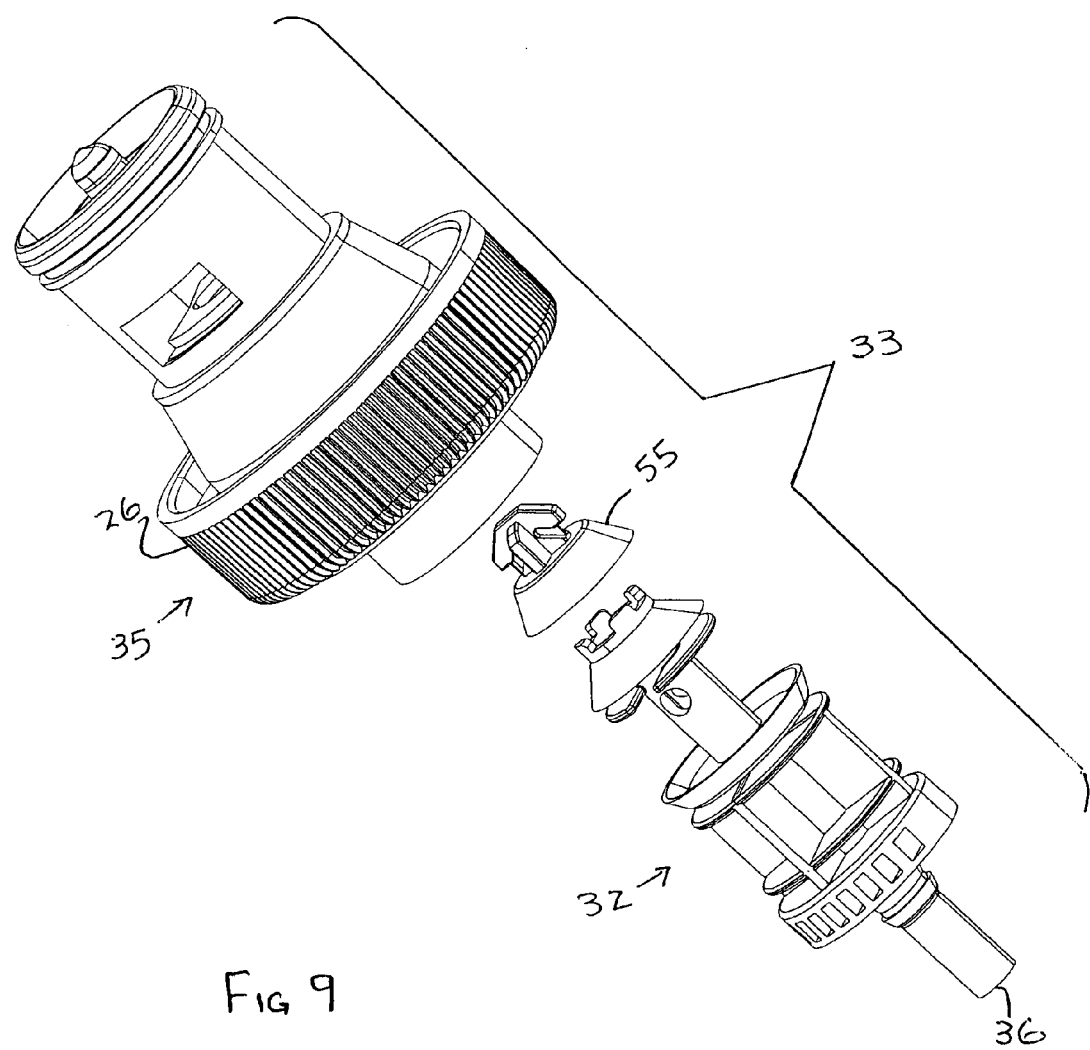
FIG. 9 is an exploded pictorial view of the piston pump shown on the piston pump reservoir unit in FIG. 8.

The first block member 23 is fixedly secured to the housing 20 against relative movement. The piston carriage member 22 is mounted to the housing 20 with the biasing springs 21 disposed between the housing 20 and the piston carriage member 22 biasing the piston carriage member 22 downwardly as seen in FIG. 2. The piston carriage member 22, as best seen in FIGS. 3 and 4, has a guide member 27 at its rear carrying vertical slide surfaces 28. The guide member 27 is slidably disposed within a vertically extending guideway 29 on the housing 20 with guide members 30 to engage the vertical guide surfaces 28 guiding the piston carriage member 22 for sliding vertically relative the housing 20 between a lower first position and an upper second position. The piston carriage member 22 carries an upwardly open socket 31 adapted to releasably engage a piston element 32 of a piston pump 33 shown in FIG. 9. The housing carries the piston pump socket 12 within which a collar 26 on a piston chamber-forming member 35 of the piston pump 33 may be secured fixed against vertical movement relative to the housing. As will be described later in greater detail, when a piston pump reservoir unit is coupled to the dispenser base assembly 10, reciprocal vertical movement of piston carriage member 22 in a cycle of operation will dispense fluid from an outlet 36 on the piston element 32.

The actuator member 25 is mounted to the housing 20 for pivoting about a pivot axis 37 by reason of stub axles 38 on the actuator member 25 being engaged within journal sockets 39 on opposed side walls 40 of the housing. The actuator member 25 includes a forwardly directed handle portion 41 adapted for engagement by a user to push the handle portion 41 rearwardly and thus pivot the actuator member 25 about the pivot axis 37, clockwise as seen in FIGS. 1 and 2.

As best seen in FIG. 3, the actuator member 25 includes a pair of rearwardly extending arms 42 each having an upwardly directed, second, cam surface 43. The piston carriage member 22 has a downwardly directed first cam surface 44 on each side thereof. The springs 21 bias the piston carriage member 22 downwardly to place the first cam surface 44 into engagement with the second cam surfaces 43.

Figure 5:
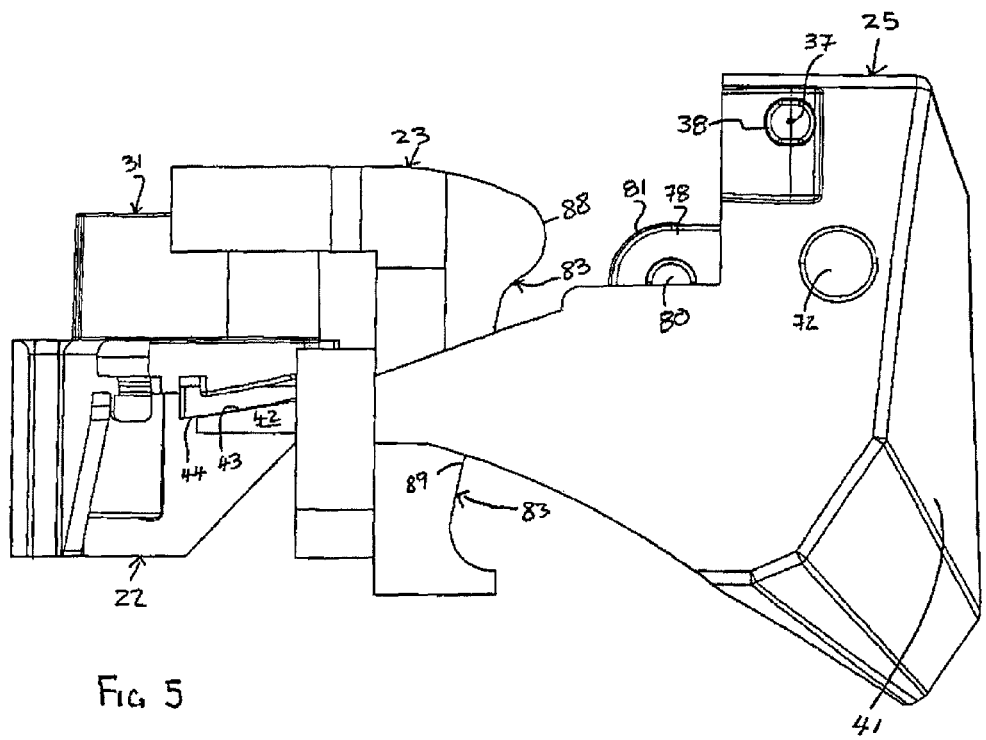
FIG. 5 is a side view of the elements shown in FIG. 3 in an extended position.
Figure 6:
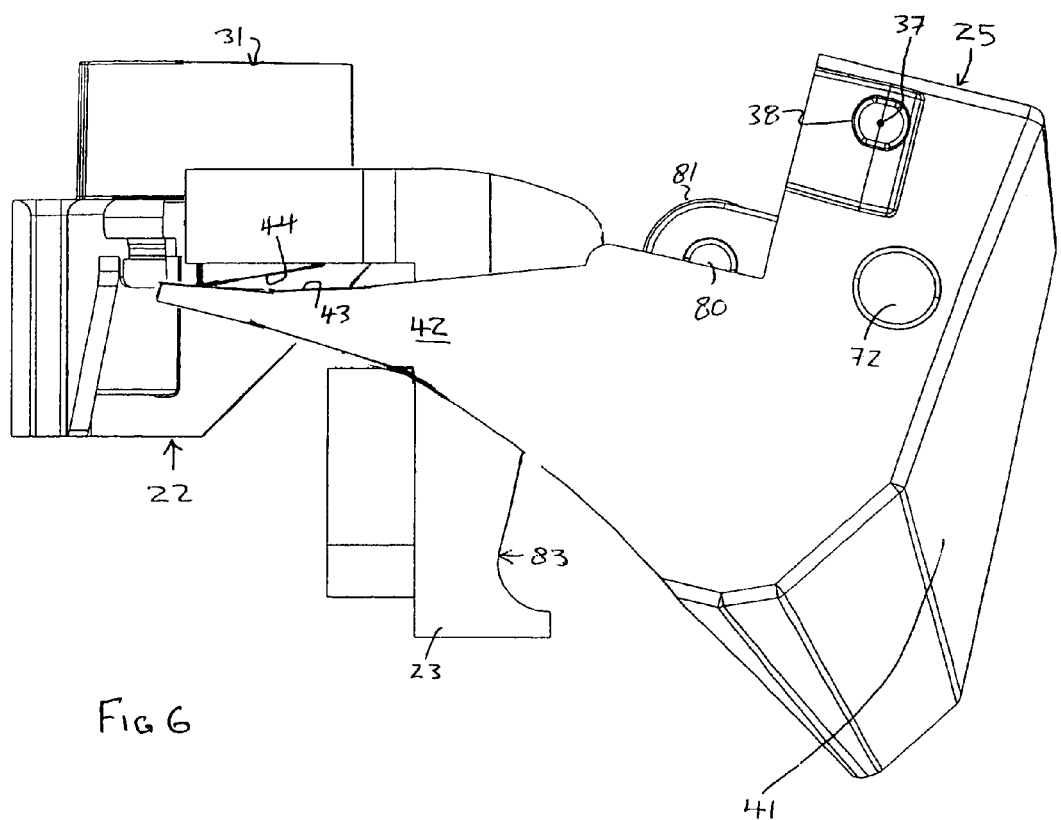
FIG. 6 is a side view identical to FIG. 5 but showing the elements in a retracted position.

FIG. 5 shows in a schematic side view, the relative positions of the actuator member 25, the first block member 23 and the piston carriage member 22 in a first configuration with the piston carriage member 22 in a first lower position fully retracted. From this fully retracted first position shown in FIG. 5, manual engagement of the handle portion 41 of the actuator member 25 will pivot the actuator member 25 relative the housing 20 about axis 37. FIG. 6 illustrates a configuration in which the actuator member 25 has been pivoted about the pivot axis 37 from a first position to a second position. Engagement between the second cam surface 43 on the arms 42 of the actuator member 25 and the first cam surfaces 44 on the piston carriage member 22 has slid the piston carriage member 22 upwardly to a retracted second position. On release of the pressure applied manually to the handle portion 41 of the actuator member 25, the bias of the springs 21 will move the piston carriage member 22 and the actuator member 25 from the retracted second position shown in FIG. 6 to the extended, rest, first position shown in FIG. 5.

Figure 10:
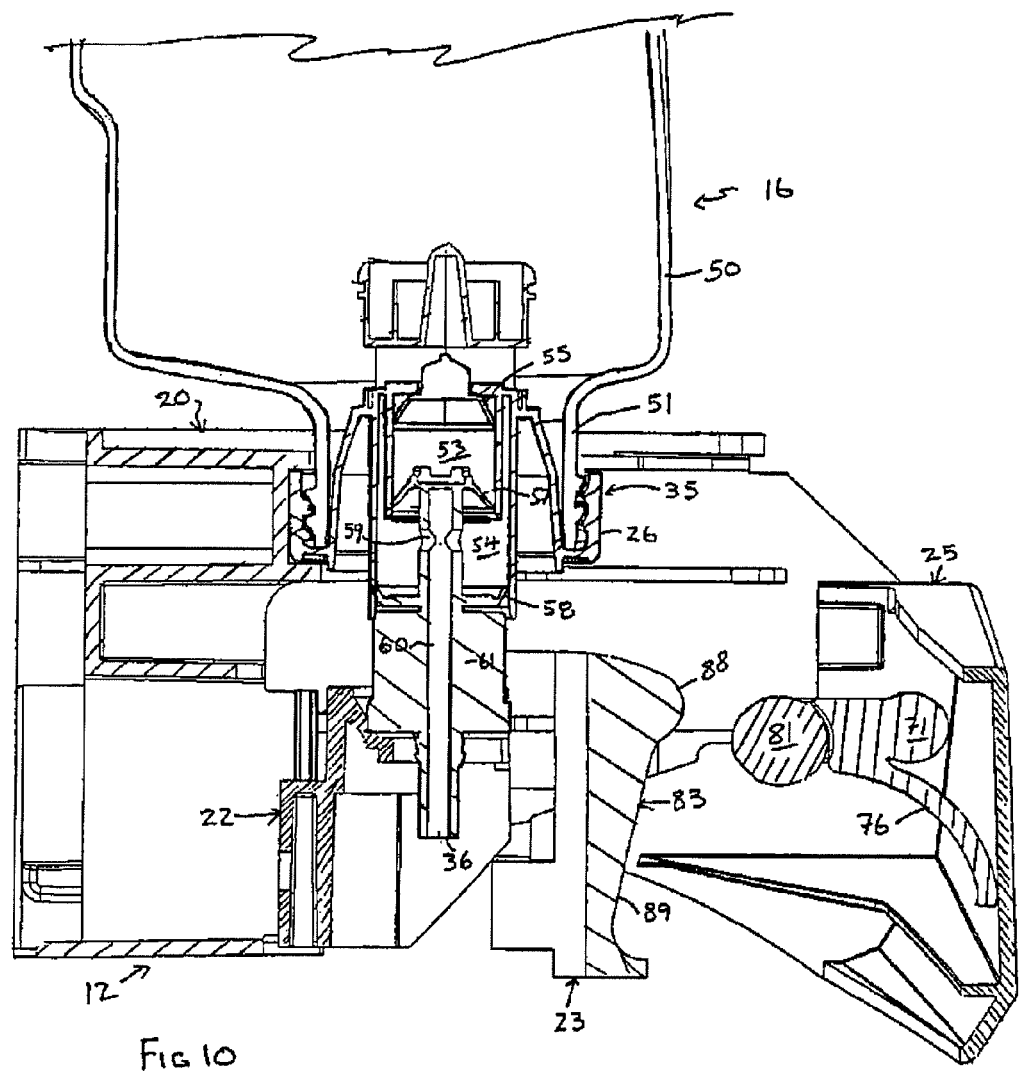
FIG. 10 is a schematic vertical cross-sectional view of the dispenser shown in FIG. 7.

FIG. 10 shows a cross-sectional side view in which the actuator member 25, the block member 23 and the piston carriage member 22 are in identical positions to those shown in FIG. 5. FIG. 10, however, shows in cross-section the piston pump reservoir unit 16 as coupled to the dispenser base assembly 12. In this regard, the piston pump reservoir unit 16 includes a reservoir bottle 50 with a neck 51 leading to an opening. The neck 51 has exterior threads by which the internally threaded collar 26 of the piston chamber-forming member 35 is secured to the reservoir bottle 50. As best seen in side view in FIG. 10, the piston chamber-forming member 35 forms two stepped cylindrical chambers 53 and 54 therein and with a one-way inlet valve 55 providing communication from the interior of the reservoir bottle 50 outwardly into the chambers. The piston element 32 is slidably received within the piston chamber-forming member 35 for coaxial sliding about a vertical axis. The piston element 32 carries deformable discs 57 and 58. Interaction of the piston element 32 within the piston chamber-forming member 35 is such that with reciprocal coaxial sliding of the piston element 32 within the piston chamber-forming member 35 in a cycle of operation, fluid is drawn from the reservoir bottle 50 past the inner disc 57 and through inlets 59 into a central hollow passageway 60 within the stem 61 of the piston element 32 to exit out the discharge outlet 36. By reason of the collar 26 of the piston chamber-forming member 35 being fixedly secured to the housing 20, and with the piston element 32 engaged with the piston carriage member 22, by manual movement of the handle portion of the actuator member 25, the piston element 32 is in a cycle of operation reciprocally moved coaxially relative to the piston chamber-forming member 35 to dispense fluid from the piston outlet 36. The piston pump reservoir unit 16 may be coupled to and removed from engagement with the dispenser base assembly 12 by sliding the piston pump reservoir unit 16 forwardly or rearwardly with the piston element 32 fully retracted.

Figure 12:
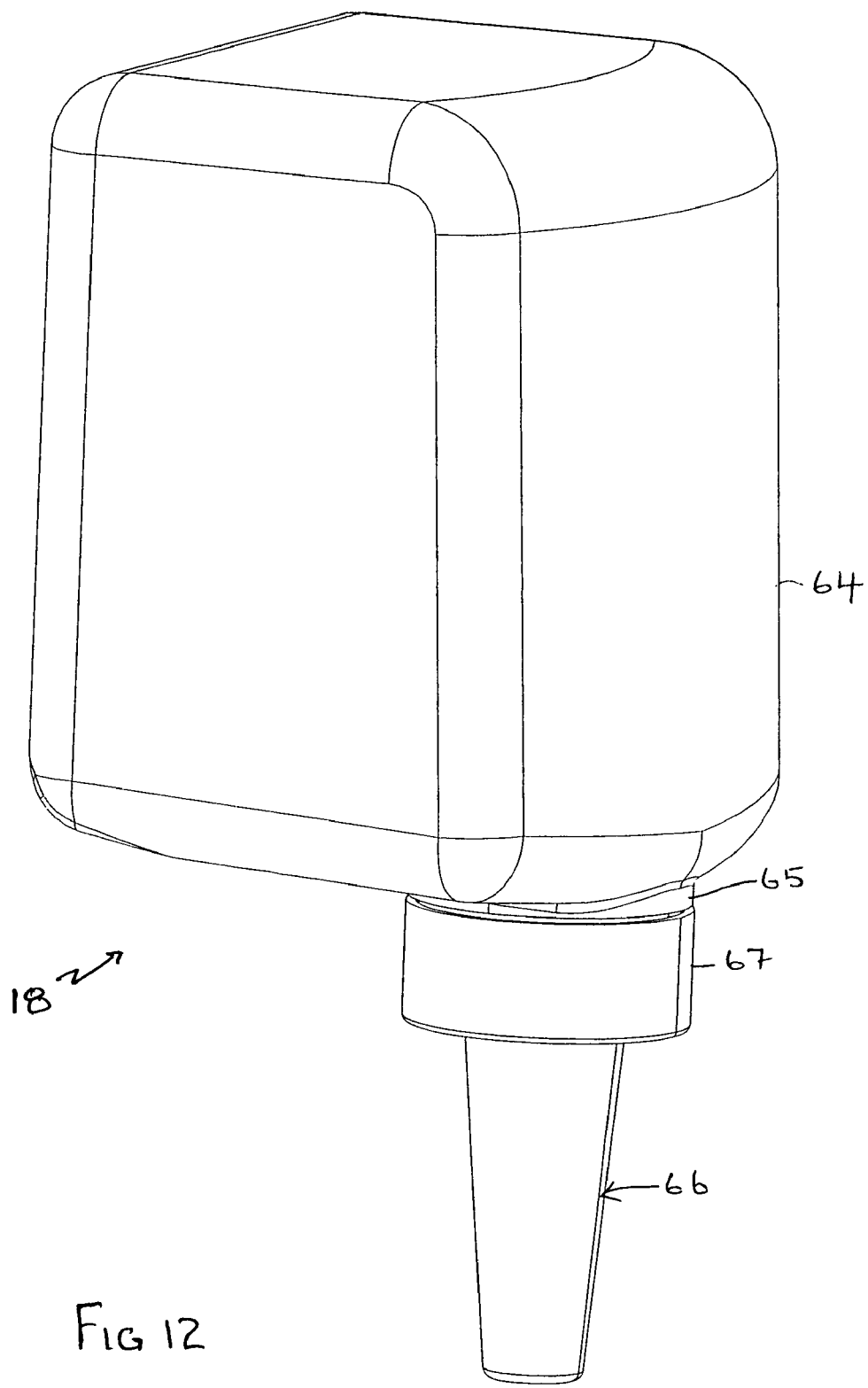
FIG. 12 is a perspective view of the peristaltic pump reservoir unit shown in FIG. 11.
Figure 13:
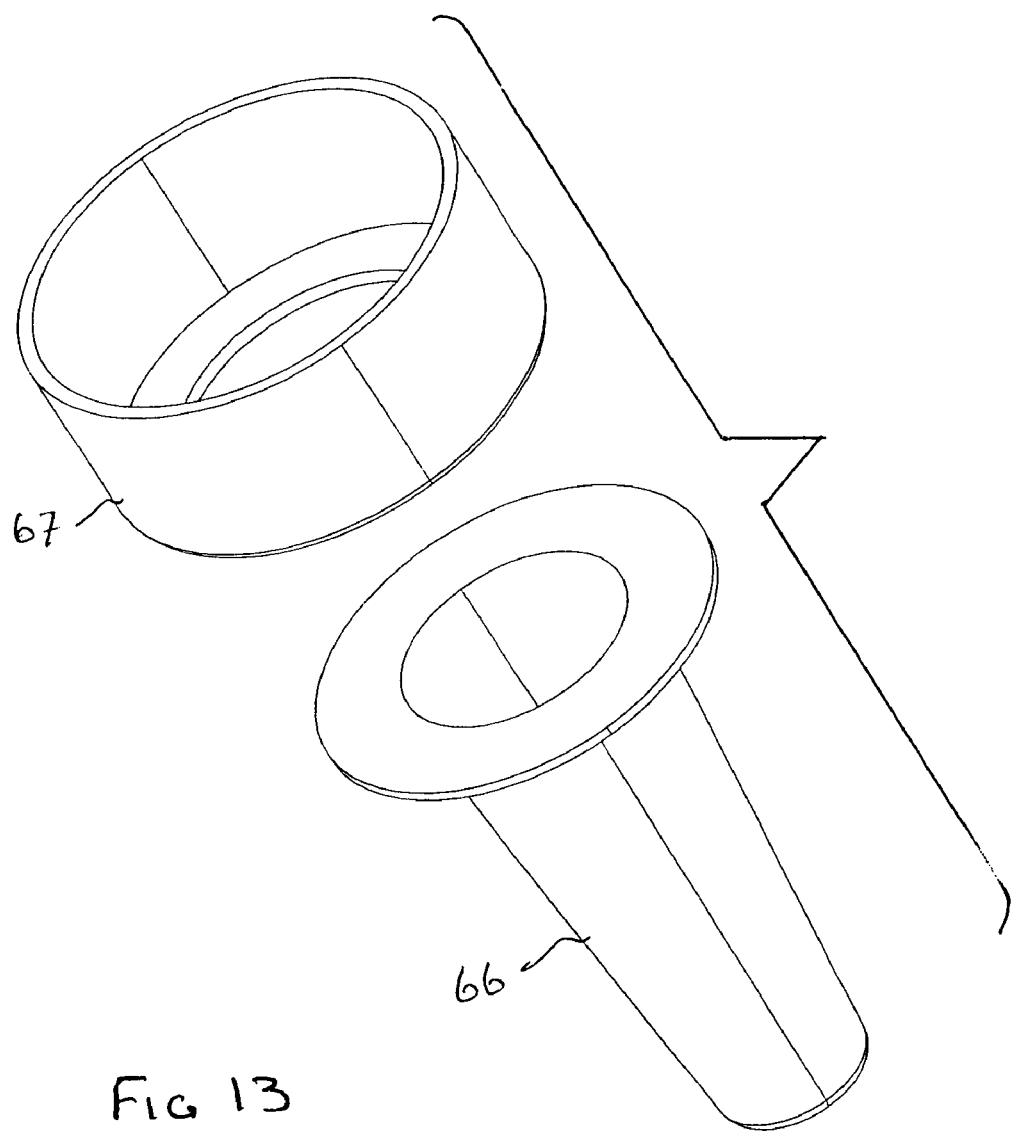
FIG. 13 is an exploded pictorial view of the cap and deformable tube of the peristaltic pump shown on the piston pump reservoir unit in FIG. 12.
Figure 14:
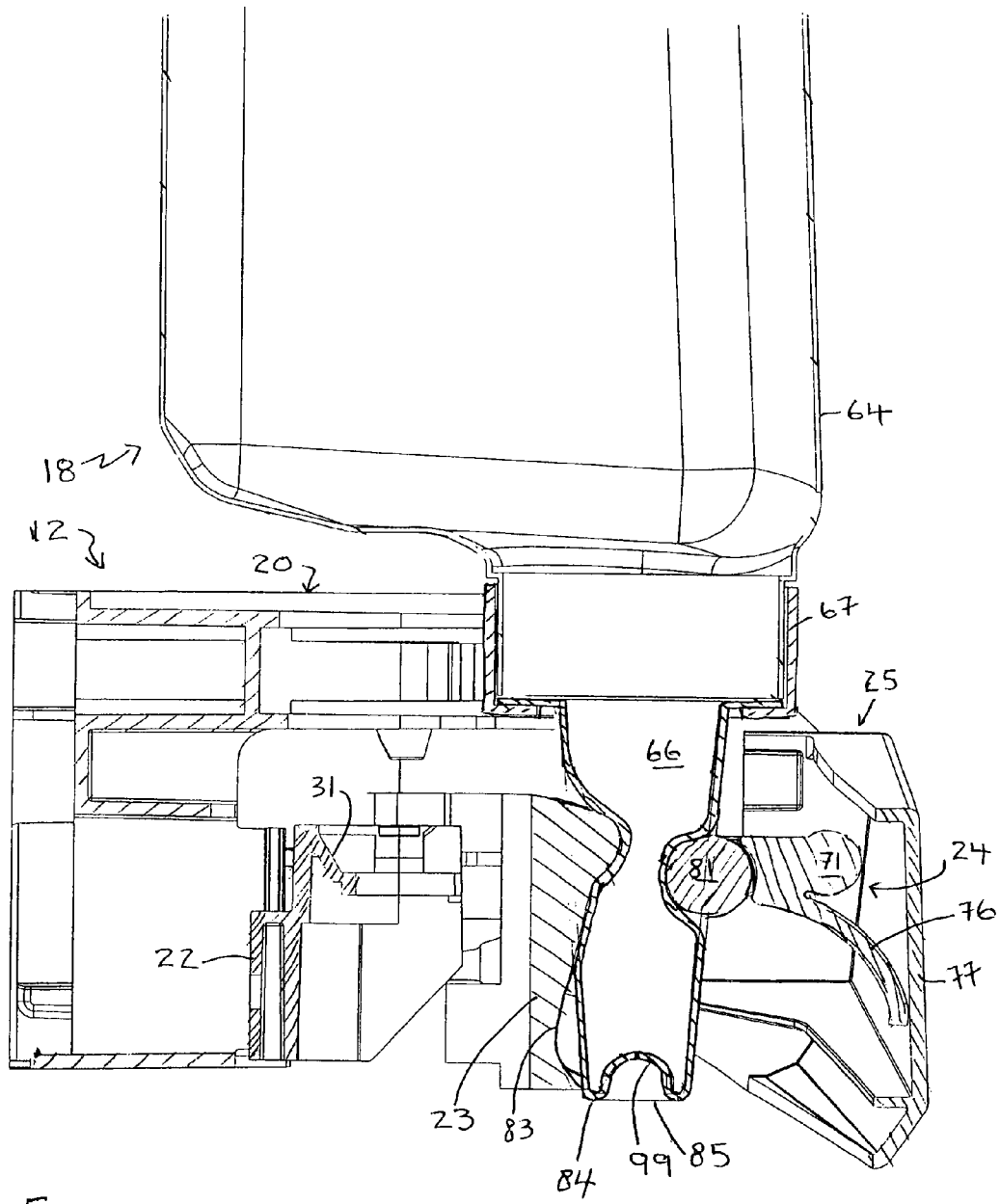
FIG. 14 is a schematic vertical cross-sectional view of the peristaltic pump shown in FIG. 11.

Reference is made to FIG. 12 which shows a peristaltic pump reservoir unit 18 comprising reservoir bottle 64 which has a neck 65 to which a deformable tube 66 sealingly attached by reason of a cap 67 as best seen in FIG. 13. The peristaltic pump reservoir unit 18 is adapted to be removably secured to the dispenser base assembly 10 with the cap 67 secured in friction fit between a pair of flexible side arms 68 shown in FIG. 1 carried on the housing 20 at the forward end of a forwardly opening U-shaped channelway. As seen in FIG. 14, with the cap 67 secured to the housing 20, the deformable tube 66 extends downwardly between the first block member 23 and the second block assembly 24.

As best seen in FIG. 2, the second block assembly 24 comprises a roller lever 71. The roller lever 71 has a pair of stub axles 72 to be engaged in journal openings 73 in each side wall 74 of the actuator member 25 for pivoting about a roller lever pivot axis 75. The roller lever 71 includes a spring arm 76 which extends rearwardly to engage a rearwardly directed surface of a front wall 77 of the actuator member 25 so as to resist pivoting of the roller lever 71 counterclockwise about the roller lever pivot axis 75 as seen in FIGS. 2 and 14. The roller lever 71 has roller arms 78 which extend forwardly relative the roller lever pivot axis 75 to where the roller arm 78 have journal openings 79 to engage stub axles 80 of a roller 81 journalling the roller 81 to the roller lever 71.

As seen in FIG. 5, the first block member 23 has forwardly directed surfaces generally indicated 83 disposed in opposition to the cylindrical surfaces of the roller 81. As best seen in FIG. 14, the deformable tube 66 is disposed between the forward surfaces 83 of the first block member 23 and the rearwardly directed surfaces on the roller 81. As shown in FIG. 14, the deformable tube 66 is in open communication with fluid in the reservoir bottle 64. The deformable tube 66 carries at its outer lower end 84, a one-way outlet valve 99 which restricts fluid flow outwardly through the outlet 85 at the lower end of the deformable tube 66 unless at least some pressure is applied to fluid within the tube. Such a one-way outlet valve 99 is preferred but not necessary as, for example, if the material being dispensed is of high viscosity. FIG. 14, like FIG. 5, shows a condition in which the actuator member 25 has been pivoted counterclockwise about the pivot axis 37 the maximum amount to a fully retracted position. In this position as seen, the deformable tube 66 has been deformed between the forwardly directed surface 83 of the first block member 23 and the roller 81. Such deformation of the deformable tube 66 may, to a minor extent, cause the spring arm 76 to be deflected permitting the roller lever 71 to be biased counterclockwise about the roller lever pivot axis 75. From the fully extended position shown in FIG. 14, on a user urging the handle portion 41 rearwardly, rearward movement of the roller 81 compresses the deformable tube 66 into the first block member 23 thus creating a pressure within the deformable tube below the roller 81 and discharging fluid out the outlet 85. On a user releasing the handle portion 41, the biasing springs 21 acting on the piston carriage member 22 will urge the actuator member 25 back to the fully extended position shown in FIG. 14. To understand the relative movement of the first block member 23 and the second block assembly 24, reference may be had to FIGS. 5 and 6. FIG. 5 shows the positions of the actuator member 25 which carries the second block assembly 24 relative to the first block member 23 substantially in the same extended position as shown in FIG. 14. FIG. 6 shows the relative positions of the first block member 23 and the roller 81 of the second block assembly 24 on pivoting of the actuator 25 forwardly to a retracted position. As seen, the first block member 23 and the second block assembly 24 receive the deformable tube 66 therebetween. The first block member 23 and the second block assembly 24 are each mounted to the housing 20 in a manner that permits movement towards and away from each other between a distant first position as shown in FIG. 5 and FIG. 14 and a proximate second position as schematically shown in FIG. 6 so as to compress the deformable tube 66 and thereby dispense material from the outlet 85 at the distal end of the deformable tube 66. Movement of the actuator member 25 between an extended and a retracted position in a cycle of operation moves the first block member 23 and the second block assembly 24 between the distant first position and the proximate second position.

The forwardly directed surface 83 of the first block member 23 has a concave forwardly rounded protrusion portion or bump 88 disposed forwardly from a lower portion 89 of the surface 83. The bump 88 and the roller 81 serve to compress the deformable tube 66 above its outlet 85 so as to trap fluid in the deformable tube between an upper compressed portion of the tube between the bump 88 and the roller 81 and assist in extruding fluid out the outlet 85 by pressurizing fluid trapped below the bump 88 and the roller 81 in the deformable tube. As the roller 81 is moved rearwardly compressing the deformable tube 66, with increased pressure, the spring arm 76 will compress permitting the roller lever 71 to pivot clockwise about the roller lever pivot axis 75 and thus direct the roller downwardly relative to the deformable tube 66.

Coupling and removal of the peristaltic pump reservoir unit 18 can be accomplished by locating the deformable tube 66 in a vertical gap between the forward surface 83 of the first block member 23 and the roller 81 of the second block assembly 24 and then moving the cap 67 downwardly into friction fit engagement between the deformable arms 68 on the housing 20.

Figure 15:
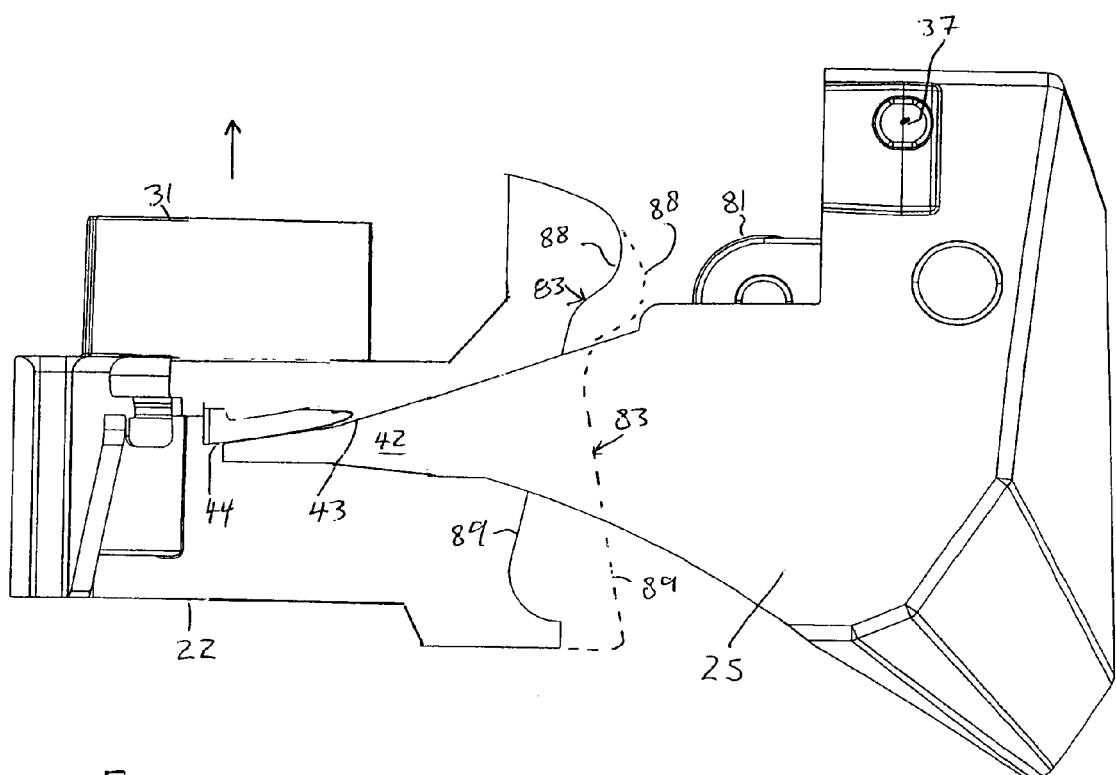
FIG. 15 is a side view similar to FIG. 5 but of a second embodiment of the invention.

Reference is made to FIG. 15 which schematically shows a second embodiment of a dispenser base assembly 10 in accordance with the present invention. FIG. 15 shows a side view the same as FIG. 5, however, in a modified second embodiment in which the piston carriage member 22 also serves as the first block member 23. In this regard, the piston carriage member 22 is identical to that shown in the first embodiment of FIG. 5, however, includes a forward portion 100 which carries the forwardly directed surface 83 and thus serves as the equivalent of the first block member 23 in FIG. 1. In the embodiment of FIG. 15, on pivoting of the actuator member 25 rearwardly, the roller 81 would move rearwardly as in the case of the first embodiment, however, the first block member 23 would with the carriage member 22 move vertically. The effect of relative upward movement of the first block member 23 relative to the second block assembly 24 may be compensated by providing a suitable configuration of the forwardly directed surface 83. The forwardly directed surface 83 is shown in FIG. 15 to have in solid lines, a configuration identical to that shown in the first embodiment of FIG. 5. An alternate configuration for the forwardly directed 83 is shown in FIG. 15 in dashed lines. As seen in dashed lines, the bump 88 is provided to be lower on the forwardly directed surface 83 and the lower portion 89 of the forwardly directed surface 83 is disposed to angle downwardly and forwardly such that with movement of the first block member 23 upwardly, the lower portion 89 will further assist in compressing the tube 66 between the first block member 23 and the roller 81. It is to be appreciated that other profiles for the forward surface 83 may be selected having regard to the interaction and relative movement of the first block member 23 and the second block assembly 24.

Figure 16:
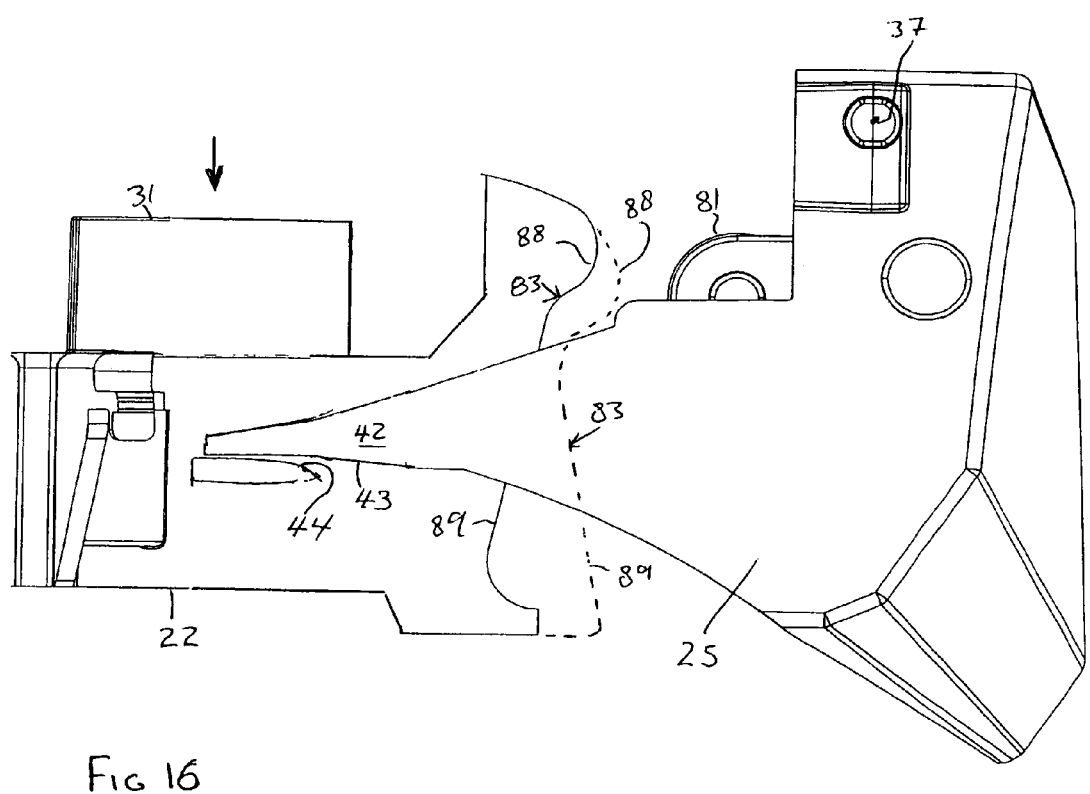
FIG. 16 is a side view similar to FIG. 5 but of a third embodiment of the invention.

Reference is made to FIG. 16 which illustrates a third embodiment of the dispenser base assembly in accordance with the present invention. The embodiment of FIG. 16 like the embodiment of FIG. 15 has the first block member 23 and its forwardly directed surface 83 provided as an integral forward portion of the piston carriage member 22 movable in unison with the piston carriage member 22. However, in FIG.

Figure 17:
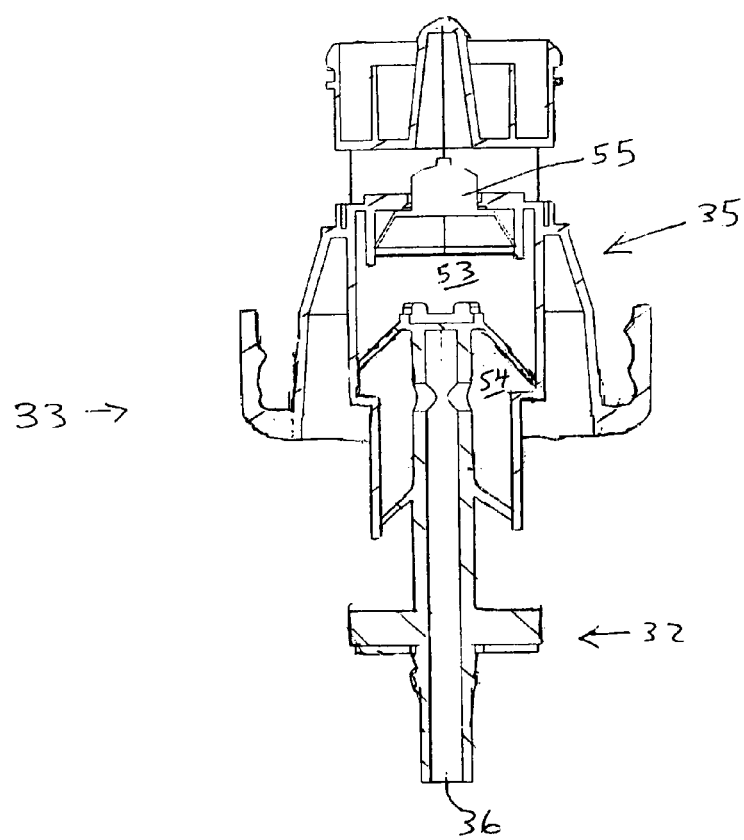
FIG. 17 is a cross-sectional view of an alternate piston pump for use with the third embodiment.

16, the first cam surface 43 of the arms 42 of the actuator member 25 are provided directed downwardly so as to engage upwardly directed first cam surfaces 44 on the piston carriage member 22. As a result, with pivoting of the actuator member 25 counterclockwise, the engagement between the cam surface 43 and the cam surface 44 slides the piston carriage member 22 downwardly. In respect of the peristaltic pump, movement of the forwardly directed surface 83 of the first block member 23 downwardly can be of assistance in compressing the deformable tube 66 in a manner which urges fluid in the tube 66 downwardly. The particular profile of the forwardly directed surfaces 83 in FIG. 16 can also be selected having regard to the interaction with the roller 81 to optimize compression of the deformable tube 66 so as to dispense fluid. In the embodiment of FIG. 16, biasing springs would need to be provided so as to bias the piston carriage member 22 to slide upwardly relative the housing 20 rather than downwardly as in the case with the first embodiment. While the piston pump 33 as shown in the first embodiment could be used with the third embodiment of FIG. 16, the piston pump 33 would have the disadvantage that it is in a withdrawal stroke with movement provided by the bias of the springs that the piston element 32 would be moved so as to discharge fluid rather than in the retraction stroke which in the embodiment of FIG. 16 is powered by the user urging the handle portion 51 rearwardly. Therefore, in accordance with the third embodiment of FIG. 16, it is preferred that a piston pump is used in which pumping of fluid occurs during the withdrawal stroke when the piston element 32 is withdrawn outwardly from the piston chamber-forming member. Such a pump is schematically shown in FIG. 17 in cross-section with the pump having a stepped configuration with the inner chamber 57 being of a larger diameter than the outer chamber such that dispensing of fluid out the outlet 36 occurs when the piston element 32 is drawn downwardly relative to the piston chamber-forming member 35.

In the preferred embodiments, the piston carriage member 22 is shown as being slidably mounted to the housing 20 for sliding vertically. This is not necessary. The piston carriage member 22 could be mounted to the housing 20 for sliding other than vertically. The piston carriage member 22 could rather than slide in a linear path move in an arcuate path as, for example, with the engagement between the piston carriage member 22 and the piston element 32 being arcuate camming surfaces.

The preferred embodiments show the actuator member 25 as being pivotally mounted to the housing. This is not necessary. The actuator member merely needs to be mounted onto the housing 20 for relative movement between a retracted position and an extended position. For example, the actuator member 25 could be mounted for front to rear sliding relative the housing 20 or for sliding vertically or some angle to the vertical. The actuator member 25 merely needs to be coupled to each of the piston carriage member 22 and the second block assembly 24 so as to provide for translating movement of the actuator member 25 into movement of both the piston carriage member 20 and movement of the second block assembly 24.

In the preferred embodiments, the second block assembly 24 is shown as including a roller lever 71 and a roller 81. These are preferred and not necessary. It is to be appreciated that in accordance with the present invention, almost any form of peristaltic pump arrangement may be utilized in which the actuator member 25 on movement results in deformation of a deformable tube to dispense fluid. Peristaltic pump arrangements in which one or both of the block members may move and which may or may not include rollers are within the scope of the present invention.

The embodiments illustrate two different reservoir bottles 50 and 64, each of which can be considered as exemplary and not limiting. Each reservoir bottle preferably has a size, configuration and shape such that it will be readily coupled to and uncoupled from the base assembly 10. Insofar as an exterior cover (not shown) may be provided in the dispenser, then the shape and configuration of the reservoir bottle may be selected to maximize the volume of fluid within the reservoir bottle which can be constrained within the cover. If desired, the same reservoir bottle could be used both for a piston pump and a peristaltic pump, however, insofar as the socket for the piston pump and the socket for the peristaltic pump are at different locations, then it may be to optimize the volume of fluid that can be provided in a reservoir within the same cover requires different reservoirs.

Reference is made to FIG. 18 which illustrates an arrangement in which both a piston pump reservoir unit 16 and a peristaltic pump reservoir unit 18 are coupled to the dispenser base assembly 10 at the same time. In this arrangement, on movement of the actuator member 25, fluid is dispensed from both the piston pump, and the peristaltic pump. This provides for a combination of fluids to be simultaneously dispensed as may be advantageous as when the two fluids may not be capable of being stored in the same reservoir. This arrangement is particularly preferable insofar as the piston pump may be selected to be a pump which dispenses liquid as a foam of air and the liquid. The preferred embodiments show the use of piston pumps to dispense fluid. The nature of the piston pump is not limited and a piston pump to dispense liquid foamed with air such as disclosed in U.S. Pat. No. 6,601,736 to Ophardt, issued Aug. 5, 2003 and U.S. Pat. No. 7,303,099 to Ophardt, issued Dec. 4, 2007, the disclosures of which are incorporated herein by reference, is advantageous for use with the present invention. Various piston pumps are suitable for use including those disclosed in U.S. Pat. No. 5,676,277 to Ophardt, issued Oct. 14, 1997; and U.S. Pat. No. 7,556,178 to Ophardt, issued Jul. 7, 2009, the disclosures of which are incorporated herein by reference.

The nature of the material which may be dispensed from the reservoirs is limited only by the nature of the pump mechanism. Flowable material particularly for the peristaltic pump can include paste-like materials including solid particles.

A dispenser in accordance with the present invention may preferably have the dispenser base assembly mounted as to a wall surface with a space below the base assembly where a user may place the user's hand and onto which hand fluid may be dispensed downwardly.

While the preferred dispenser shows a manual dispenser, that is, with the actuating member 25 being moved by a user, it is to be appreciated that a similar dispenser base assembly 10 could be provided for an automated dispenser in which upon activation, electrical power could be applied to a motor as to move the activator member through a cycle of operation simultaneously moving both the piston carriage member 22 and the second block assembly 24.

The coupling between the actuator member 25 and the piston carriage member 22 has been shown by the way of camming surfaces. Many variations and modifications of such camming surfaces may be adopted as, for example, with the piston carriage member 22 have stub axles extending laterally to its sides to be received in slots in each of the arms 42 on the actuator member 25. The stub axles as in the manner of pins could ride in the slots with the slots having the desired configuration to provide for relative movement of the piston carriage member 22.

In the preferred embodiments, the springs 21 are provided as biasing means which bias the piston carriage member 22 relative to the housing. Alternatively, the biasing means may be provided between different components as, for example, between the housing and the actuator member 25. Biasing springs would be acceptable provided that the piston carriage member 22 and the activator member 25 as well as the second block assembly 24 correspondingly couple to and follow each other's corresponding motions. However, it is not, strictly speaking, necessary that biasing springs 21 be provided and, for example, a cycle of operation could be accomplished by the activator member 25 being moved manually inwardly and then outwardly by a user, however, with a need for the piston carriage member 22 to be coupled to the actuator member 25 so as to follow the actuator member 25 when the actuator member 25 is moved in a cycle of operation.

While the invention has been described with reference to preferred embodiments, many modifications and variations will now occur to a person skilled in the art. For a definition of the invention, reference is made to the following claims.

We claim:

1. A dispenser for flowable materials comprising:
   a replaceable piston pump reservoir unit comprising a reservoir for flowable material and a piston pump, the piston pump including a piston chamber-forming member coupled to the reservoir and forming a piston chamber in communication with material in the reservoir, the piston pump including a piston element reciprocally slidably received in piston chamber-forming member for movement between a retracted position and an extended position to dispense material from the reservoir out a piston pump outlet on the piston element,
   a replaceable peristaltic pump reservoir unit comprising a reservoir for flowable material and a deformable tube member in communication with material in the reservoir providing a peristaltic pump outlet to dispense material from the reservoir,
   a housing;
   the housing including both a piston pump socket arrangement adapted to removably engage the piston pump reservoir unit for dispensing material from the piston pump reservoir unit and a peristaltic pump socket arrangement adapted to removably engage the pump reservoir unit for dispensing material from the peristaltic pump reservoir unit;
   the piston pump socket arrangement including a piston carriage member mounted to the housing for relative movement between a first position and a second position;
   the piston carriage adapted to removably engage the piston element;
   an actuator member mounted to the housing for relative movement between a retracted position and an extended position;
   the piston carriage member and actuator member coupled such that movement of the actuator member between the retracted position and the extended position correspondingly moves the piston carriage member between the first position and the second position;
   the peristaltic pump socket arrangement having a first block member and a second block member removably receiving the deformable tube there between, the first block member and the second block mounted to the housing for movement towards and away from each other between a distant first position and a proximate second position to compress the deformable tube and dispense material from an outlet distal end of the deformable tube;
   the first block member and actuator member coupled such that movement of the actuator member between the retracted position and the extended position correspondingly moves the first member between the first position and the second position.

2. A dispenser as claimed in claim 1 including a biasing member biasing the actuator member toward one of the retracted position and the extended position.

3. A dispenser as claimed in claim 1 wherein the actuator member having a handle portion for engagement by a user to manually move the actuator member toward the one of the retracted position and the extended position against the bias of the biasing member.

4. A dispenser as claimed in claim 1 wherein the actuator member includes a lever mounted to the housing for relative pivoting about a pivot axis between the retracted position and the extended position.

5. A dispenser as claimed in claim 4 wherein the pivot axis is horizontal.

6. A dispenser as claimed in claim 1 wherein the piston carriage member is mounted to the housing for relative sliding movement between the first position and the second position.

7. A dispenser as claimed in claim 1 wherein when the piston pump reservoir unit is engaged with the piston pump socket arrangement, the piston element is slidable vertically relative the piston chamber-forming member, the piston carriage member is mounted to the housing for relative vertical sliding movement between the first position and the second position.

8. A dispenser as claimed in claim 1 wherein the piston carriage member having a first cam surface,
   the lever having a second cam surface engaging the first cam surface to couple the piston carriage member and actuator member.

9. A dispenser as claimed in claim 2 wherein the piston carriage member having a first cam surface,
   the lever having a second cam surface engaging the first cam surface to couple the piston carriage member and actuator member;
   the biasing member in biasing the actuator member toward one of the retracted position and the extended position biasing the second cam surface of the lever into the first cam surface on the piston carriage member.

10. A dispenser as claimed in claim 5 wherein the first block member is carried on the lever and the second block member is mounted on the housing.

11. A dispenser as claimed in claim 5 wherein the first block member is mounted on the housing and the second block member is carried on the piston carriage member.

12. A dispenser as claimed in claim 11 wherein the first block member is fixedly secured to the housing.

13. A dispenser as claimed in claim 12 wherein the second block member is fixedly secured to the piston carriage member.

14. A dispenser as claimed in claim 11 wherein
   the piston pump dispenses material on movement of the piston carriage member downwardly moving the piston element toward the extended position,
   the peristaltic pump dispenses material on movement of the piston element downwardly moving the second block member from the distant first position toward the distant second position to compress the deformable tube.

15. A dispenser as claimed in claim 14 wherein the handle portion is pushed by a user away from the user to move the actuator member toward the retracted position against the bias of the biasing member to move the piston carriage member downwardly.

16. A dispenser as claimed in claim 5 wherein the handle portion is pushed by a user away from the user to move the actuator member toward the retracted position against the bias of the biasing member to move the piston carriage member upwardly.

17. A dispenser as claimed in claim 16 wherein
the piston pump dispenses material on movement of the piston carriage member upwardly moving the piston element toward the retracted position,
the peristaltic pump dispenses material on movement of the piston element upwardly moving the second block member from the distant first position toward the distant second position to compress the deformable tube.

18. A dispenser as claimed in claim 1 wherein
when the piston pump reservoir unit is engaged with the piston pump socket arrangement, the piston carriage engages the piston element, and manual movement by a user of the handle portion moves the actuator member which moves the piston carriage member and the engaged piston element dispensing material from the reservoir out the piston pump outlet, and
when the peristaltic pump reservoir unit is engaged with the peristaltic pump socket arrangement, the first block member and the second block member receives the deformable tube there between, and manual movement by a user of the handle portion moves the actuator member which moves the first block member and the second block member compressing the deformable tube dispensing material from the reservoir out the peristaltic pump outlet.

19. A dispenser as claimed in claim 1 wherein only one of the following conditions may exist simultaneously:
a first condition in which the piston pump reservoir unit is engaged with the piston pump socket arrangement, and
a second condition in which the peristaltic pump reservoir unit is engaged with the peristaltic pump socket arrangement.

20. A dispenser as claimed in claim 1 wherein both of the following conditions may exist simultaneously:
a first condition in which the piston pump reservoir unit is engaged with the piston pump socket arrangement, and
a second condition in which the peristaltic pump reservoir unit is engaged with the peristaltic pump socket arrangement.

* * * * *